(12) United States Patent
Sugimoto (10) Patent No.: US 11,493,811 B2
(45) Date of Patent: Nov. 8, 2022

(54) ELECTRO-OPTICAL DEVICE AND ELECTRONIC APPARATUS

(71) Applicant: SEIKO EPSON CORPORATION, Tokyo (JP)

(72) Inventor: Yohei Sugimoto, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/386,582

(22) Filed: Jul. 28, 2021

(65) Prior Publication Data

US 2022/0035210 A1    Feb. 3, 2022

(30) Foreign Application Priority Data

Jul. 28, 2020  (JP) .............................. JP2020-127096

(51) Int. Cl.
*G02F 1/1368* (2006.01)
*G02F 1/1362* (2006.01)

(52) U.S. Cl.
CPC ...... *G02F 1/136213* (2013.01); *G02F 1/1368* (2013.01); *G02F 1/136209* (2013.01); *G02F 1/136286* (2013.01); *G02F 2201/123* (2013.01)

(58) Field of Classification Search
CPC ......... G02F 1/136213; G02F 1/136209; G02F 1/136286; G02F 1/1368; G02F 2201/123; G02F 1/136227
See application file for complete search history.

(56) References Cited

U.S. PATENT DOCUMENTS

| 5,999,234 A * | 12/1999 | Budd | G02F 1/1334 349/139 |
| 6,014,189 A * | 1/2000 | Budd | G02F 1/136213 349/39 |
| 6,404,474 B1 | 6/2002 | Watanabe et al. | |
| 2010/0171131 A1* | 7/2010 | Iki | H01L 27/124 257/91 |
| 2020/0117063 A1 | 4/2020 | Sugimoto | |

FOREIGN PATENT DOCUMENTS

| JP | 2000039626 | 2/2000 |
| JP | 2001066633 | 3/2001 |
| JP | 2020064130 | 4/2020 |

\* cited by examiner

*Primary Examiner* — James A Dudek
(74) *Attorney, Agent, or Firm* — JCIPRNET (57) ABSTRACT

In an electro-optical device, at a position overlapping in plan view with a data line, a groove is provided that extends through a first interlayer insulating film provided in a layer between a scan line and a transistor, and a second interlayer insulating film provided in a layer between the transistor and a pixel electrode, and reaches a substrate body. A capacitance element includes a first element portion provided between the second interlayer insulating film and the pixel electrode, and a second element portion provided along an inner wall of the groove. The groove reaches an intermediate position in a thickness direction of the substrate body, and a depth is 3 μm or greater. Therefore, capacitance of the capacitance element is large. A contact hole that electrically couples a gate electrode and the scan line is provided on a side of a semiconductor film.

8 Claims, 11 Drawing Sheets

ELECTRO-OPTICAL DEVICE AND ELECTRONIC APPARATUS

The present application is based on, and claims priority from JP Application Serial Number 2020-127096, filed Jul. 28, 2020, the disclosure of which is hereby incorporated by reference herein in its entirety.

BACKGROUND

1. Technical Field

The present disclosure relates to an electro-optical device including a capacitance element electrically coupled to a pixel electrode, and to an electronic apparatus.

2. Related Art

An electro-optical device (liquid crystal device) used as a light valve or the like of a projection-type display device is provided with a semiconductor film between a substrate body and a pixel electrode, and a transistor is configured using the semiconductor film. In addition, one electrode of the capacitance element is electrically coupled to the pixel electrode and a drain of the transistor, and a capacitance line is electrically coupled to another electrode of the capacitance element. In such an electro-optical device, even when a pixel pitch is narrowed, and when trying to ensure a high pixel opening ratio, a plane area of the capacitance element decreases, and capacitance of the capacitance element decreases. On the other hand, structure has been proposed in which, in order to obtain large capacitance even when the plane area of the capacitance element is small, a capacitance element is provided along an inner wall of a groove (see JP 2001-66633 A). For example, JP 2001-66633 A proposes structure in which a groove is formed in an interlayer insulating film formed between a substrate body and a transistor, and a capacitance element is provided inside the groove. More specifically, while an extending portion of a drain region at a bottom of the groove overlaps with additional capacitor common wiring as a lower light shielding film via a dielectric film, a stacked film formed from the extending portion of the drain region, a dielectric film, and an upper light shielding film is formed along an inner wall of the groove, and the upper light shielding film is electrically coupled to the lower light shielding film.

However, in the structure described in JP 2001-66633 A, the groove is formed in only one layer of the interlayer insulating film, so the groove is shallow. Therefore, there is a problem in that capacitance of the capacitance element is small even when the stacked film including the extending portion of the drain region, the dielectric film, and the upper light shielding film is stacked along the inner wall of the groove.

SUMMARY

In order to solve the above-described problem, an aspect of an electro-optical device according to the present disclosure includes a substrate body, a pixel electrode, a light shielding scan line extending in a first direction in a layer between the substrate body and the pixel electrode, a first interlayer insulating film provided in a layer between the light shielding scan line and the pixel electrode, a light shielding data line extending in a second direction intersecting the first direction in a layer between the first interlayer insulating film and the pixel electrode, a transistor including a semiconductor film extending between the first interlayer insulating film and the light shielding data line so as to overlap with the light shielding scan line and the data line, a second interlayer insulating film provided in a layer between the transistor and the pixel electrode, and a capacitance element electrically coupled to the pixel electrode, wherein a groove is provided that extends through the first interlayer insulating film and the second interlayer insulating film at a position overlapping in plan view with the light shielding data line and reaches the substrate body, and the capacitance element includes a first element portion provided between the second interlayer insulating film and the pixel electrode, and a second element portion provided along an inner wall of the groove.

An electro-optical device to which the present disclosure is applied is used for a variety of electronic apparatuses. In the present disclosure, when an electronic apparatus is a projection-type display device, the projection-type display device is provided with a light source unit configured to emit light to be supplied to an electro-optical device, and a projection optical system configured to project light modulated by the electro-optical device.

DESCRIPTION OF EXEMPLARY EMBODIMENTS

Exemplary embodiments of the disclosure will be described below with reference to the drawings. Note that, in each of the figures to be referred to in the following description, to illustrate each layer, each member, and the like in a recognizable size in the drawings, each layer, each member, and the like are illustrated at a different scale. Moreover, in the description described below, when each layer formed at a first substrate 10 is described, an upper layer side or a front surface side means a side (a side on which a second substrate 20 is located) opposite to a side on which a substrate body 19 is located, and a lower layer side means a side on which the substrate body 19 is located. In addition, of two intersecting directions among in-plane directions of the first substrate 10, a direction in which a scan line 3a extends is a first direction X, and a direction in which a data line 6a extend is a second direction Y. In addition, one side in a direction along the second direction Y is one side Y1 in the second direction Y, another side in the direction along the second direction Y is another side Y2 in the second direction Y, one side in a direction along the first direction X is one side X1 in the first direction X, and another side in the direction along the first direction X is another side X2 in the first direction X.

In the following description, a case will be mainly described in which "one signal line" of the scan line 3a and the data line 6a is the scan line 3a, and "another signal line" is the data line 6a.

Exemplary Embodiment 1

1. Configuration of Electro-Optical Device 100

Figure 1:
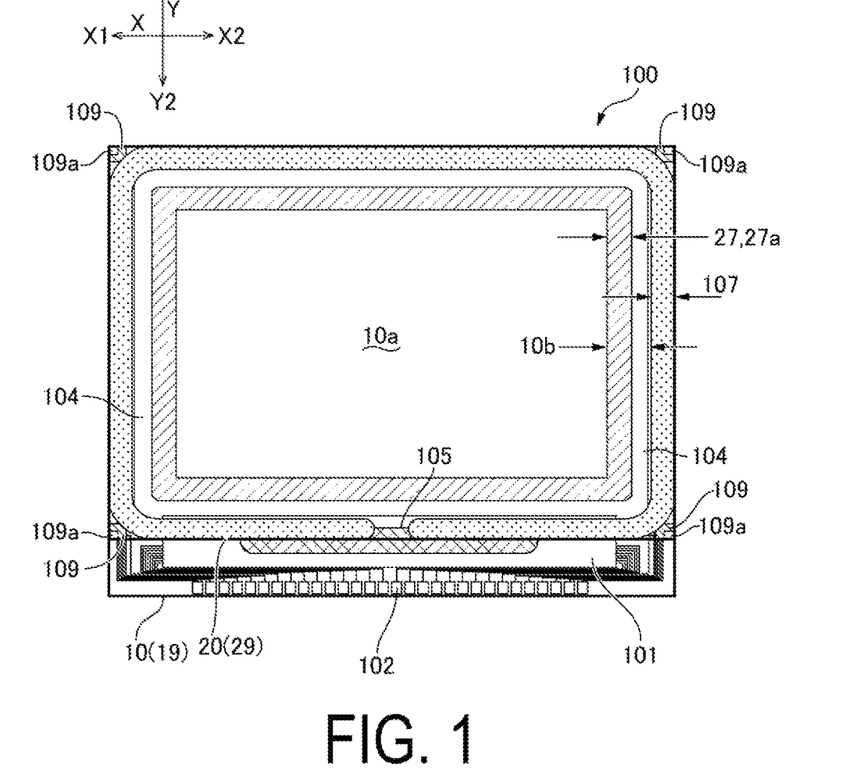
FIG. 1 is a plan view of an electro-optical device according to Exemplary Embodiment 1 of the present disclosure.
Figure 2:
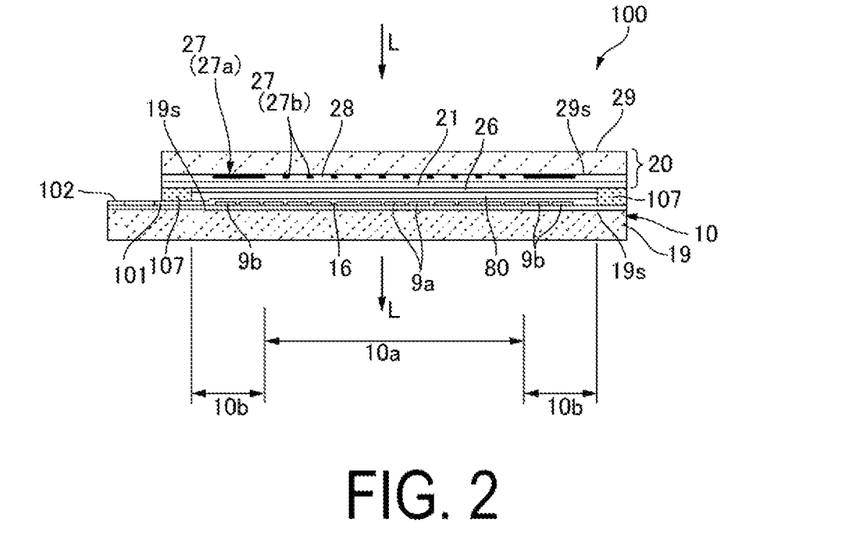
FIG. 2 is a cross-sectional view of the electro-optical device illustrated in FIG. 1.

FIG. 1 is a plan view of an electro-optical device 100 according to Exemplary Embodiment 1 of the present disclosure. FIG. 2 is a cross-sectional view illustrating the electro-optical device 100 illustrated in FIG. 1. As illustrated in FIG. 1 and FIG. 2, in the electro-optical device 100, the first substrate 10 and the second substrate 20 are bonded together with a sealing material 107 creating a predetermined gap, where the first substrate 10 is opposed to the second substrate 20. The sealing material 107 is provided in a frame-like shape in conformance with the outer edge of the second substrate 20. An electro-optical layer 80 such as a liquid crystal layer is provided in an area surrounded by the sealing material 107 between the first substrate 10 and the second substrate 20. The seal material 107 is a photocurable adhesive, or a photocurable and thermosetting adhesive, and a gap material such as glass fiber or glass beads for setting a distance between the substrates to a predetermined value is compounded in the sealing material 107. In the present exemplary embodiment, the first substrate 10 and the second substrate 20 both have a quadrangle shape, and in a substantially central portion of the electro-optical device 100, a display region 10a is provided as a quadrangle region. In accordance with such a shape, the sealing material 107 is also provided in a substantially quadrangular shape, and a peripheral region 10b having a rectangular frame shape is provided between an inner peripheral edge of the sealing material 107 and an outer peripheral edge of the display region 10a.

The first substrate 10 includes a substrate body 19 formed of a transmissive substrate such as a quartz substrate or a glass substrate. On one surface 19s side of the substrate body 19 on the second substrate 20 side, on an outer side of the display region 10a, a data line driving circuit 101 and a plurality of terminals 102 are formed along one side of the first substrate 10. A scan line driving circuit 104 is formed along other sides adjacent to the one side. Although not illustrated, a flexible wiring substrate is coupled to the terminals 102, and various kinds of potential and various signals are input to the first substrate 10 via the flexible wiring substrate.

The display region 10a on the one surface 19s of the substrate body 19 is formed, in a matrix pattern, with a plurality of transmissive pixel electrodes 9a made from an Indium Tin Oxide (ITO) film. A first orientation film 16 is formed on the second substrate 20 side with respect to the pixel electrodes 9a, and the pixel electrodes 9a are covered with the first orientation film 16.

The second substrate 20 includes a substrate body 29 formed of a transmissive substrate such as a quartz substrate or a glass substrate. On one surface 29s side, which faces the first substrate 10, of the substrate body 29, a transmissive common electrode 21 including, for example an ITO film or the like, is formed. A second orientation film 26 is formed on the first substrate 10 side with respect to the common electrode 21. The common electrode 21 is formed over substantially the entire surface of the second substrate 20, and is covered with the second orientation film 26. At the second substrate 20, a light shielding layer 27 having a light-shielding property and including resin, metal, or a metal compound is formed between the substrate body 29 and the common electrode 21. A transmissive protective layer 28 is formed between the light-shielding layer 27 and the common electrode 21. The light shielding layer 27 is formed, for example, as a partition 27a in a frame-like shape extending along the outer peripheral edge of the display region 10a. The light-shielding layer 27 is also formed as a light shielding layer 27b constituting a black matrix in regions overlapping in plan view with regions each located between the pixel electrodes 9a adjacent to each other. Regions overlapping, when viewed in plan view, with the partition 27a in the peripheral region 10b of the first substrate 10 are formed with dummy pixel electrodes 9b formed simultaneously with the pixel electrodes 9a. Note that, a lens may be provided at the second substrate 20 at a position facing the pixel electrode 9a, and in this case, the light shielding layer 27b is often not formed.

Any of the first orientation film 16 and the second orientation film 26 is an inorganic orientation film including a diagonally vapor-deposited film of SiOx (x<2), SiO2, TiO2, MgO, Al2O3, and the like, for example, and liquid crystal molecules having negative dielectric anisotropy used for the electro-optical layer 80 are tilt-oriented. Therefore, the liquid crystal molecules form a predetermined angle with respect to the first substrate 10 and the second substrate 20. In this way, the electro-optical device 100 is constituted as a liquid crystal device of a Vertical Alignment (VA) mode.

The first substrate 10 includes an inter-substrate conduction electrode 109 being formed in a region positioning outside the sealing material 107 and overlapping with a corner portion of the second substrate 20 such that electrical conduction is established between the first substrate 10 and the second substrate 20. An inter-substrate conduction material 109a including conductive particles is disposed in the inter-substrate conduction electrode 109. The common electrode 21 of the second substrate 20 is electrically coupled to the first substrate 10 side via the inter-substrate conduction material 109a and the inter-substrate conduction electrode 109. Therefore, common potential is applied to the common electrode 21 from the first substrate 10 side.

In the electro-optical device 100, the pixel electrodes 9a and the common electrode 21 are formed of a transmissive conductive film such as an ITO film, and the electro-optical device 100 is constituted as a transmissive liquid crystal device. In the electro-optical device 100, of the first substrate 10 and the second substrate 20, light that is incident to the electro-optical layer 80 from either one of the substrates is modulated while passing through the other substrate and being emitted, and displays an image. In the present exemplary embodiment, the electro-optical device 100 displays an image by the light incident from the second substrate 20 being modulated by the electro-optical layer 80 for each of the pixels while passing through the first substrate 10 and being emitted, as indicated by an arrow L.

2. Schematic Configuration of Pixels

Figure 3:
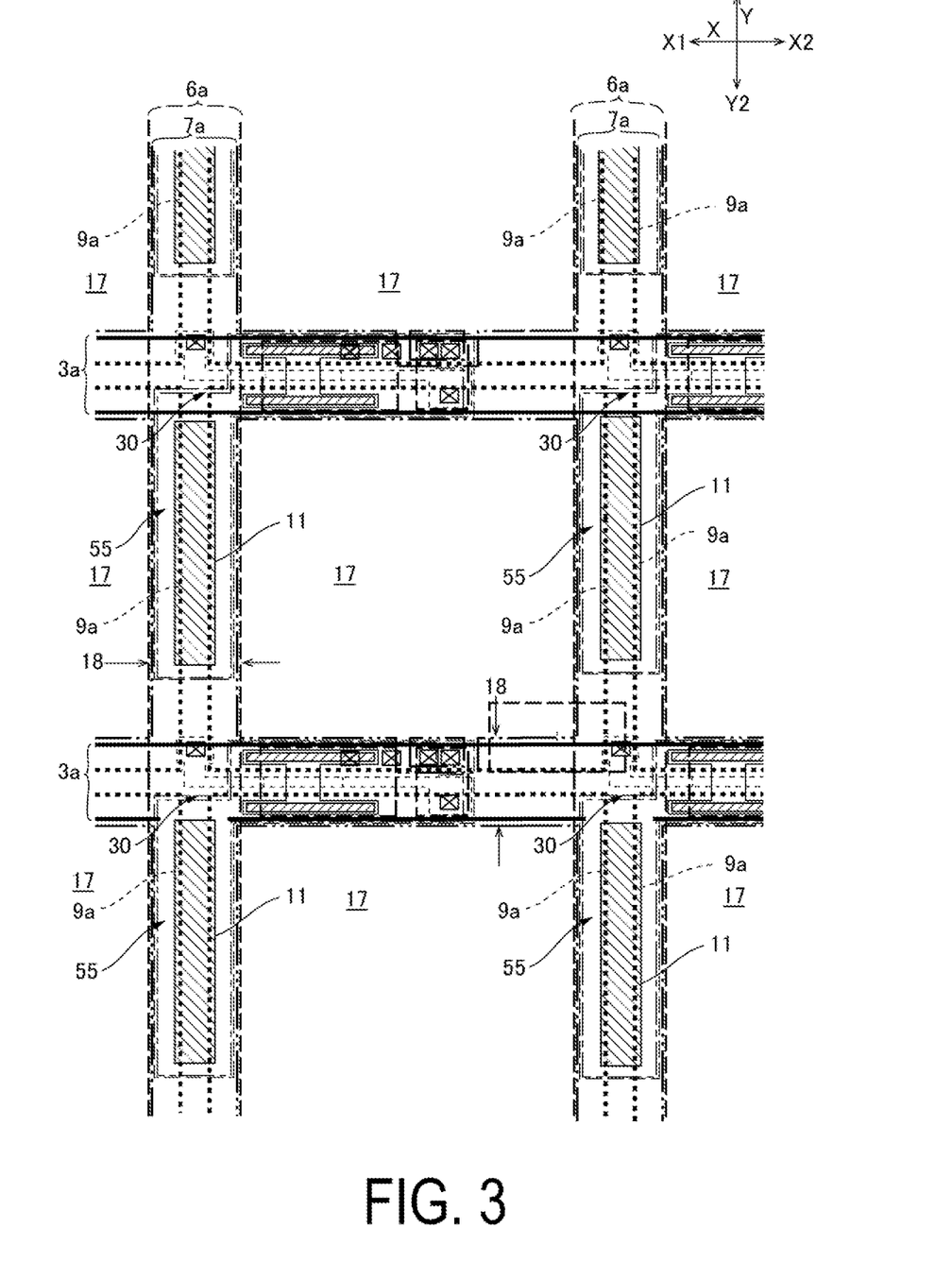
FIG. 3 is a plan view of a plurality of pixels adjacent to each other in the electro-optical device illustrated in FIG. 1.
Figure 4:
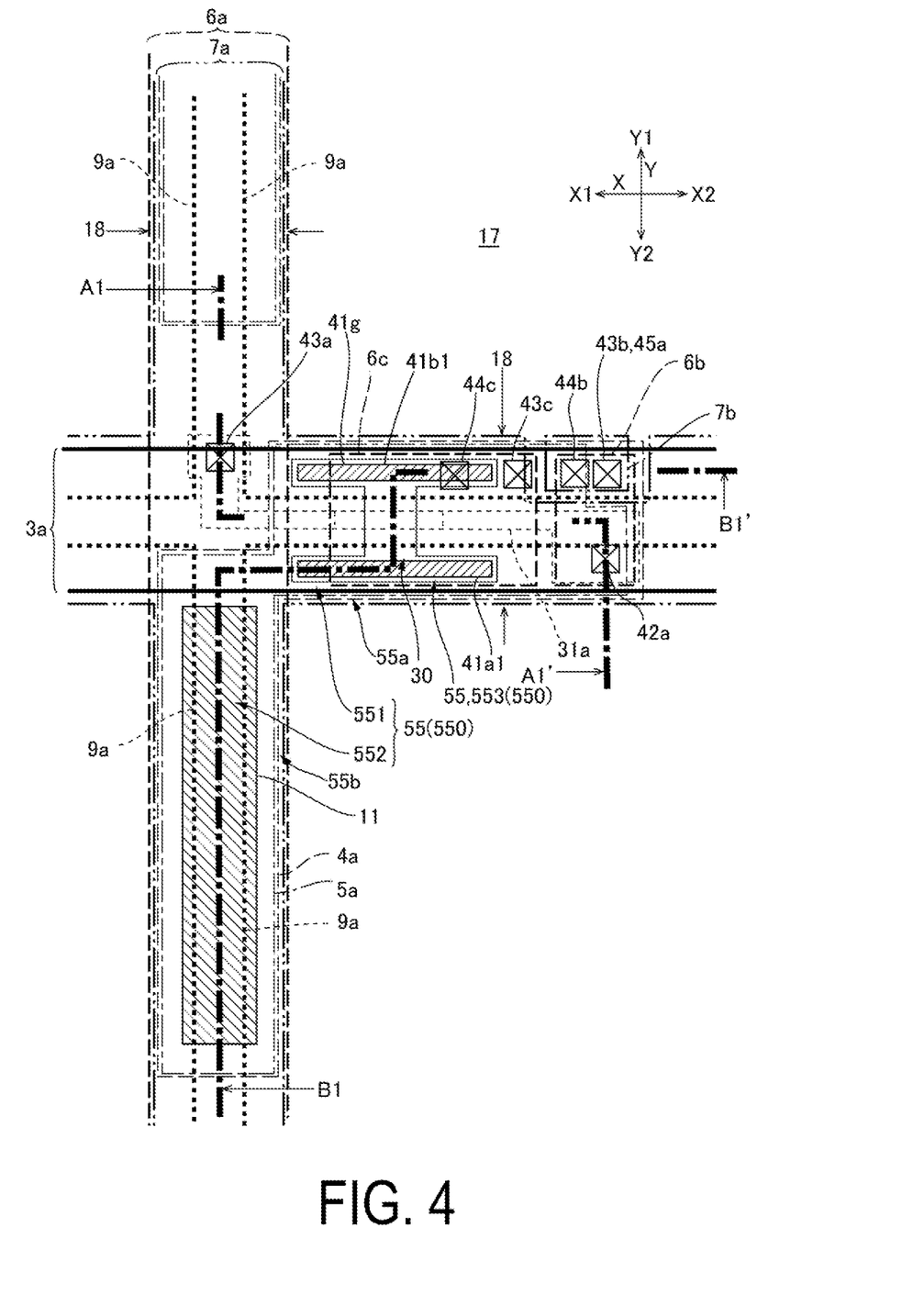
FIG. 4 is an enlarged plan view illustrating one of the pixels illustrated in FIG. 3.
Figure 5:
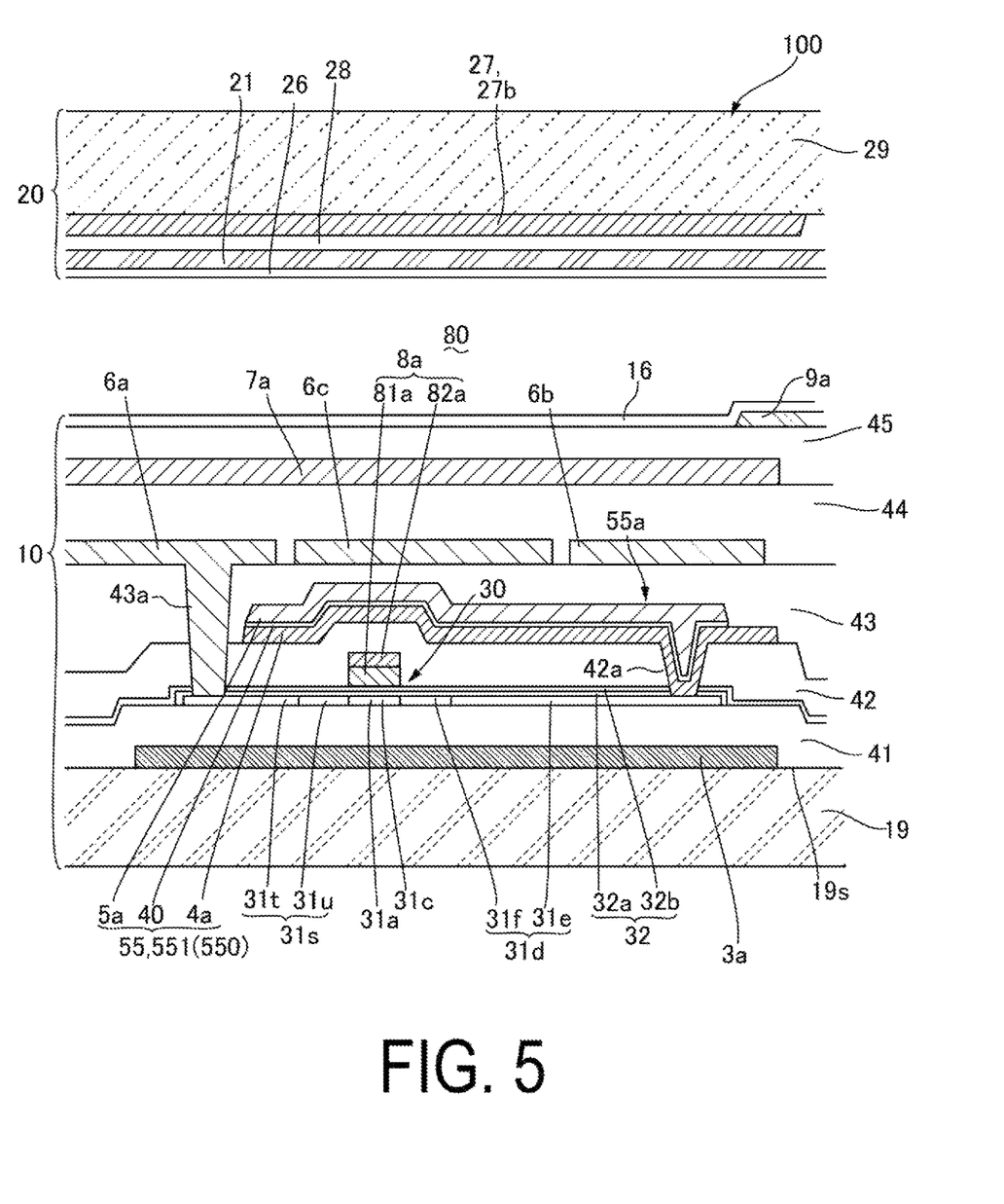
FIG. 5 is an A-A' cross-sectional view of FIG. 4.
Figure 6:
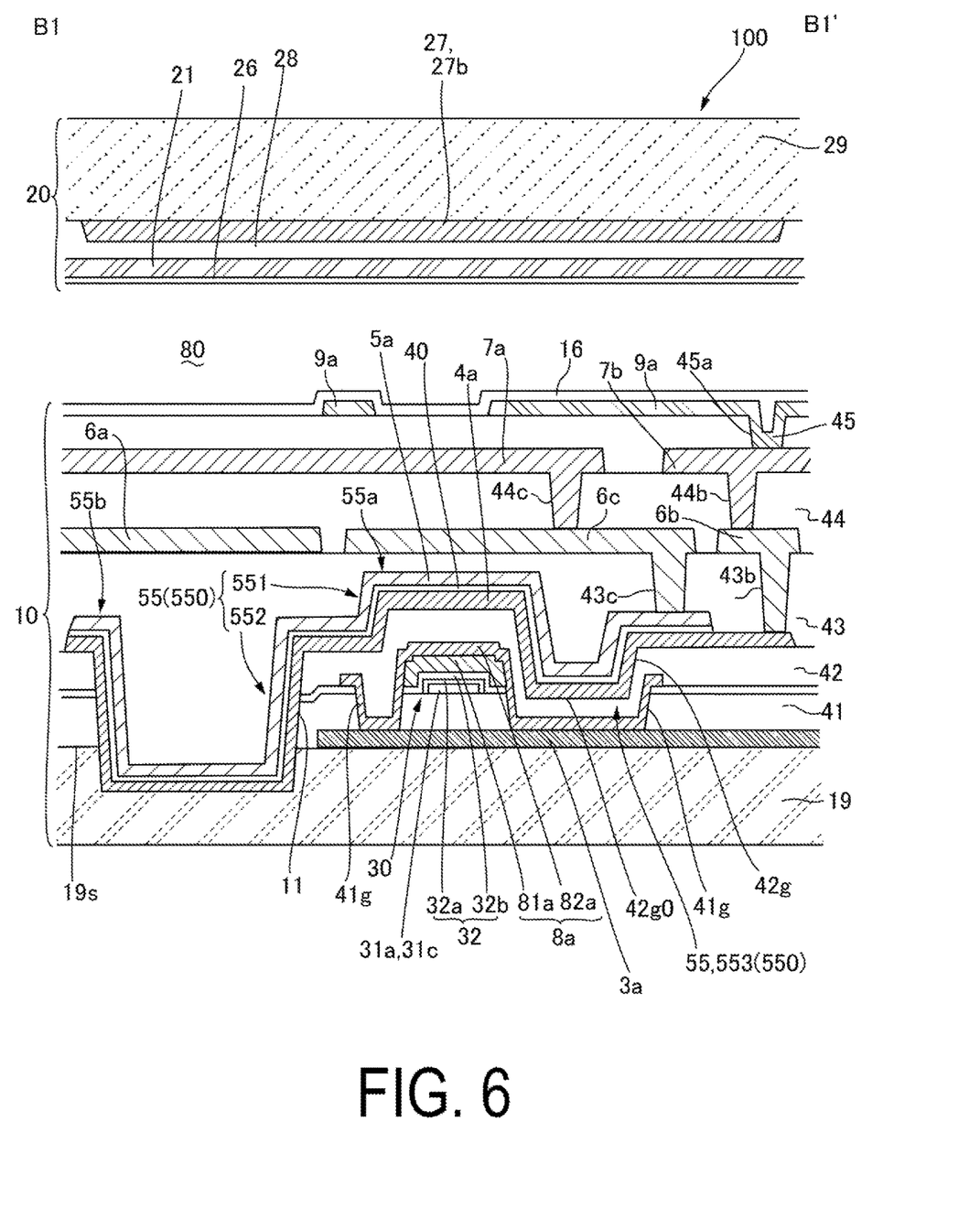
FIG. 6 is a B-B' cross-sectional view of FIG. 4.

FIG. 3 is a plan view of the plurality of pixels adjacent to each other in the electro-optical device 100 illustrated in FIG. 1. FIG. 4 is an enlarged plan view illustrating one of the pixels illustrated in FIG. 3, and in FIG. 4, a vicinity of a transistor 30 is enlarged and illustrated. FIG. 5 is the A-A' cross-sectional view of FIG. 4. FIG. 6 is the B-B' cross-sectional view of FIG. 4. Note that, in FIG. 3 and FIG. 4, and FIG. 7 to FIG. 9 to be described later, layers are indicated by the lines below. Further note that in FIG. 3 and FIG. 4, and FIG. 7 to FIG. 9 described below, respective positions of end portions are shifted, for layers whose end portions are mutually overlapped in plan view, to make a shape and the like of the layer easily recognizable. In addition, a contact hole 41g is illustrated with a region hatched with oblique lines rising to the right, and a groove 11 is illustrated with a region hatched with oblique lines rising to the left.

The scan line 3a=a thick solid line
A semiconductor film 31a=a thin and short broken line
A gate electrode 8a=a thin solid line
A first capacitance electrode 4a=a thin and long dashed line
A second capacitance electrode 5a=a thin alternate long and short dash line
The data line 6a and relay electrodes 6b and 6c=thick and long dashed lines
A capacitance line 7a and a relay electrode 7b=thick two-dot chain lines
The pixel electrode 9a=a thick short dashed line As illustrated in FIG. 3 and FIG. 4, the pixel electrode 9a is formed at each of the plurality of pixels on a surface of the first substrate 10 facing the second substrate 20, where the scan line 3a, the data line 6a, and the capacitance line 7a extend along an inter-pixel region between the pixel electrodes 9a adjacent to each other. The data line 6a extends in the second direction Y in the inter-pixel region. The scan line 3a extends in the first direction X in the inter-pixel region. The capacitance line 7a extends along the second direction Y and the first direction X in the inter-pixel region. Further, the transistor 30 is formed corresponding to an intersection between the data line 6a and the scan line 3a. Here, the scan line 3a, the data line 6a, and the capacitance line 7a each have a light shielding property. Accordingly, a region in which the scan line 3a, the data line 6a, the capacitance line 7a, and an electrode in the same layer as these wiring lines are formed is a light shielding region 18 through which light does not transmit, and a region surrounded by the light shielding region 18 is an aperture region 17 through which light transmits.

As illustrated in FIG. 5 and FIG. 6, in the first substrate 10, the light shielding scan line 3a is provided in a layer between the substrate body 19 and the pixel electrode 9a, a first interlayer insulating film 41 is provided in a layer between the scan line 3a and the pixel electrode 9a, and the light shielding data line 6a is provided in a layer between the first interlayer insulating film 41 and the pixel electrode 9a. Further, in the first substrate 10, the transistor 30 including the semiconductor film 31a is provided in a layer between the first interlayer insulating film 41 and the data line 6a, and a second interlayer insulating film 42 is provided in a layer between the transistor 30 and the pixel electrode 9a. Further, interlayer insulating films 43, 44, and 45 are stacked in order in a layer between the second interlayer insulating film 42 and the pixel electrode 9a, between the substrate body 19 and the pixel electrode 9a. The first interlayer insulating film 41, the second interlayer insulating film 42, and the interlayer insulating films 43, 44, and 45 each include a transmissive insulating film such as silicon oxide. In the present exemplary embodiment, a surface on the pixel electrode 9a side of each of the interlayer insulating film 43 and the interlayer insulating film 45 is formed as a continuous plane by chemical mechanical polishing or the like.

3. Detailed Description of Each Layer

Figure 7:
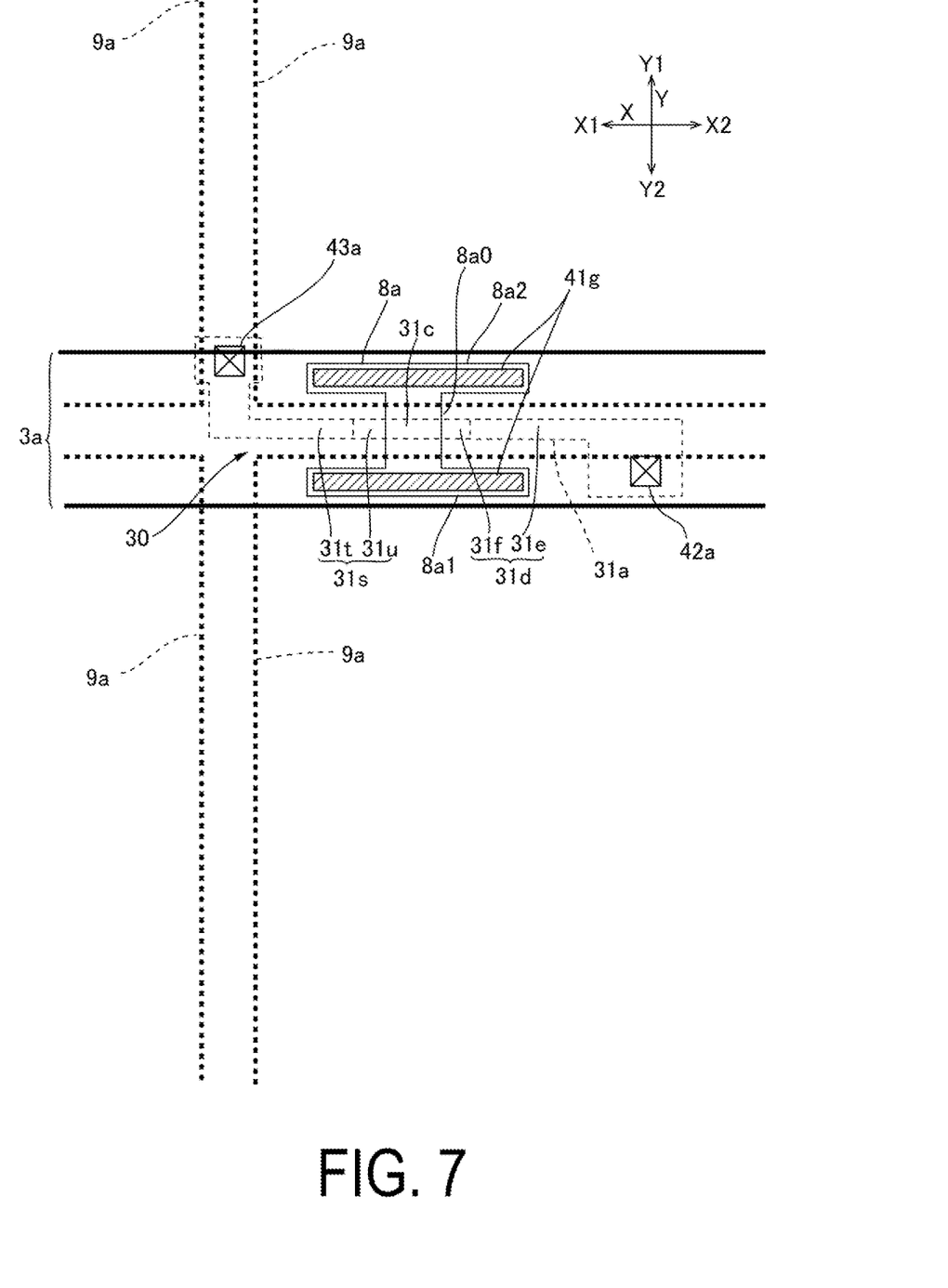
FIG. 7 is a plan view of a scan line, a semiconductor film, a gate electrode, and the like illustrated in FIG. 5 and FIG. 6.
Figure 8:
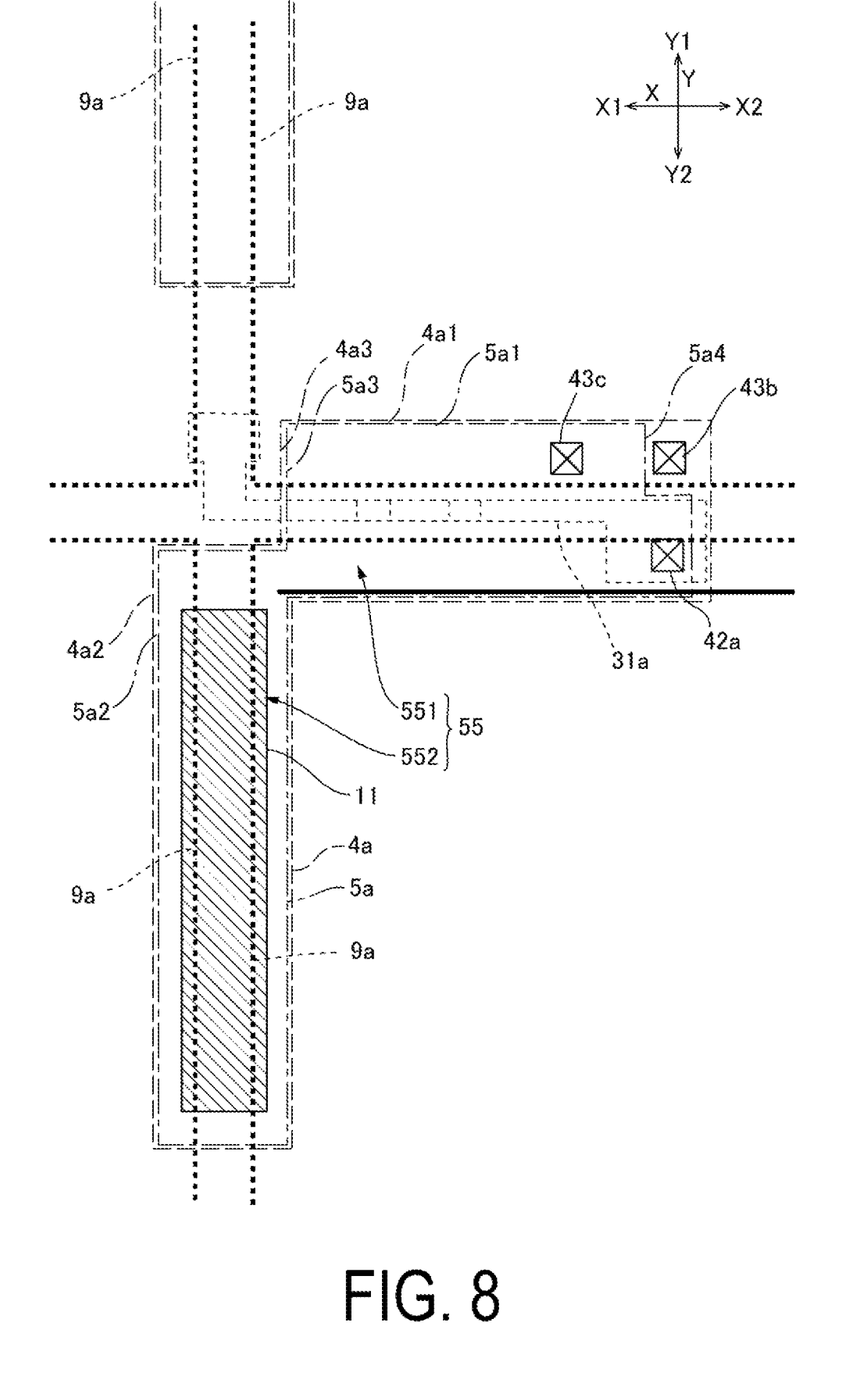
FIG. 8 is a plan view of a first capacitance electrode, a second capacitance electrode, and the like illustrated in FIG. 5 and FIG. 6.
Figure 9:
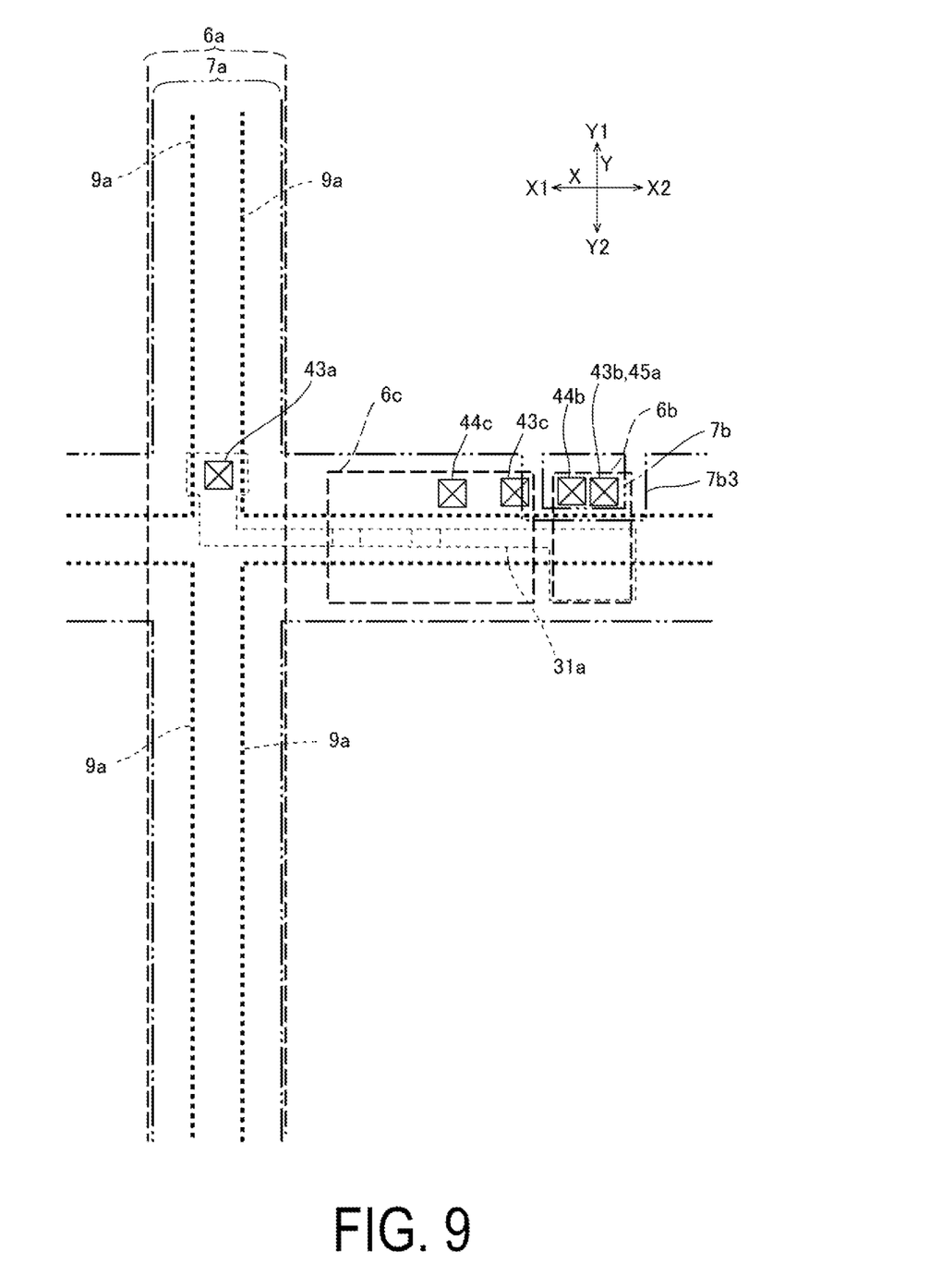
FIG. 9 is a plan view of a data line, a capacitance line, and the like illustrated in FIG. 5 and FIG. 6.

A detailed configuration of the first substrate 10 will be described with reference to FIG. 5 and FIG. 6, while referring to FIG. 7 to FIG. 9 described below as necessary. FIG. 7 is a plan view of the scan line 3a, the semiconductor film 31a, the gate electrodes 8a, and the like illustrated in FIG. 5 and FIG. 6. FIG. 8 is a plan view of the first capacitance electrode 4a, the second capacitance electrode 5a, and the like illustrated in FIG. 5 and FIG. 6. FIG. 9 is a plan view of the data line 6a, the capacitance line 7a, and the like illustrated in FIG. 5 and FIG. 6. Note that, FIG. 7 to FIG. 9 each illustrate a contact hole related to electrical coupling of the electrodes and the like illustrated in those drawings, and each illustrate the semiconductor film 31a and the pixel electrode 9a for indicating a position to be referenced.

First, as illustrated in FIG. 5 and FIG. 6, in the first substrate 10, the scan line 3a extending along the first direction X is formed between the substrate body 19 and the first interlayer insulating film 41. The scan line 3a is formed of a light shielding conductive film such as a metal silicide film, a metal film, or a metal compound film. In the present exemplary embodiment, the scan line 3a is formed of tungsten silicide (WSi), tungsten, or titanium nitride.

Between the first interlayer insulating film 41 and the second interlayer insulating film 42 is formed the transistor 30 for pixel switching. The transistor 30 includes the semiconductor layer 31a formed at a surface of the first interlayer insulating film 41 on an opposite side to the substrate body 19, a gate insulating film 32 stacked on the pixel electrode 9a side of the semiconductor film 31a, and the gate electrode 8a overlapping in plan view with the semiconductor film 31a on the pixel electrode 9a side of the gate insulating film 32. The semiconductor film 31a includes, for example, a polysilicon layer. The gate insulating film 32 has two-layer structure including a first gate insulating film 32a including a silicon oxide film that is obtained by thermally oxidizing the semiconductor film 31a, and a second gate insulating film 32b including a silicon oxide film that is formed by using, for example, a low-pressure CVD method. The gate electrode 8a is formed of a conductive film such as a conductive polysilicon film, a metal silicide film, a metal film, or a metal compound film.

The contact hole 41g for electrically coupling the scan line 3a and the gate electrode 8a of the transistor 30 is provided in the first interlayer insulating film 41. A detailed configuration of such a contact hole 41g will be described below with reference to FIG. 10 to FIG. 12.

As illustrated in FIG. 7, the scan line 3a extends linearly along the first direction X with the same width dimension. The semiconductor film 31a extends from an intersecting portion of the scan line 3a and the data line 6a to the other side X2 in the first direction X, and overlaps with the scan line 3a in plan view. A portion of the semiconductor film 31a overlapping in plan view with the gate electrode 8a is a channel region 31c. In the present exemplary embodiment, the transistor 30 has lightly doped drain (LDD) structure.

Accordingly, in the semiconductor film 31a, a data line side source drain region 31s on the one side X1 in the first direction X in which the data line 6a is positioned with respect to the channel region 31c includes a first region 31t spaced apart from the channel region 31c, and a first low concentration region 31u sandwiched between the first region 31t and the channel region 31c, and the first low concentration region 31u has a lower impurity concentration than that of the first region 31t. In addition, in the semiconductor film 31a, a pixel electrode side source drain region 31d on the other side X2 in the first direction X opposite to the data line 6a with respect to the channel region 31c includes a second region 31e spaced apart from the channel region 31c, and a second low concentration region 31f sandwiched between the second region 31e and the channel region 31c, and the second low concentration region 31f has a lower impurity concentration than that of the second region 31e.

The gate electrode 8a includes a first electrode portion 8a0 and second electrode portions 8a1 and 8a2. The first electrode portion 8a0 extends in the second direction Y so as to overlap in plan view with the semiconductor film 31a via the gate insulating film 32. The second electrode portions 8a1 and 8a2 extend in the first direction X along the semiconductor film 31a from respective end portions on both sides of the first electrode portion 8a0 in the second direction Y on both sides in the second direction Y of the semiconductor film 31a. The second electrode portions 8a1 and 8a2 do not overlap in plan view with the semiconductor film 31a.

In FIG. 5 and FIG. 6, a capacitance element 55 is provided that includes the first capacitance electrode 4a, the dielectric film 40, and the second capacitance electrode 5a, between the second interlayer insulating film 42 and the interlayer insulating film 43 on an upper layer side of the transistor 30. The capacitance element 55 is a retention capacitor that prevents a fluctuation in an image signal retained by a liquid crystal capacitor configured between the pixel electrode 9a of the first substrate 10 and the common electrode 21 of the second substrate 20. The first capacitance electrode 4a and the second capacitance electrode 5a are each formed of a conductive film such as a conductive polysilicon film, a metal silicide film, a metal film, or a metal compound film. In the present exemplary embodiment, the first capacitance electrode 4a and the second capacitance electrode 5a are each a conductive polysilicon film.

As illustrated in FIG. 8, the first capacitance electrode 4a includes a body portion 4a1 that extends in the first direction X so as to overlap in plan view with the scan line 3a and the semiconductor film 31a, and a protruding portion 4a2 that protrudes from the body portion 4a1 so as to overlap in plan view with the data line 6a, and an end portion of the body portion 4a1 is electrically coupled to the second region 31e of the semiconductor film 31a via a contact hole 42a formed in the second interlayer insulating film 42. The first capacitance electrode 4a has a notch 4a3 formed so as to not overlap in plan view with an end portion of the semiconductor film 31a overlapping with the data line 6a.

The second capacitance electrode 5a includes a body portion 5a1 that overlaps with a body portion 5a1 of the first capacitance electrode 4a in plan view, and a protruding portion 5a2 that overlaps with the protruding portion 4a2 of the first capacitance electrode 4a in plan view. Accordingly, the capacitance element 55 includes a first portion 55a extending in the first direction X so as to overlap with the semiconductor film 31a, and a second portion 55b extending in the second direction Y so as to overlap with the data line 6a. In addition, the second capacitance electrode 5a, similar to the first capacitance electrode 4a, has a notch 5a3 formed so as not to overlap in plan view with an end portion of the semiconductor film 31a overlapping with the data line 6a. Also, a notch 5a4 is formed in an end portion of the body portion 5a1 of the second capacitance electrode 5a on the other side X2 in the first direction X, so as not to overlap with an end portion of the body portion 4a1 of the first capacitance electrode 4a.

In the present exemplary embodiment, to constitute the capacitance element 55, the groove 11 that extends through the first interlayer insulating film 41 and the second interlayer insulating film 42 and reaches the substrate body 19 is provided at a position overlapping in plan view with the data line 6a, and the capacitance element 55 includes a first element portion 551 provided between the second interlayer insulating film 42 and the pixel electrode 9a, and a second element portion 552 provided along an inner wall of the groove 11. In other words, in the capacitance element 55, a stacked film 550 including the first capacitance electrode 4a, the dielectric film 40, and the second capacitance electrode 5a extends from an inside of the groove 11 to between the second interlayer insulating film 42 and the pixel electrode 9a. Accordingly, the first element portion 551 is constituted by a portion of the stacked film 550 provided between the second interlayer insulating film 42 and the pixel electrode 9a, and the second element portion 552 is constituted by a portion provided inside the groove 11.

In the present exemplary embodiment, the groove 11 reaches an intermediate position in a thickness direction of the substrate body 19, and a depth of the groove 11 is 3 μm or greater. For example, the depth of the groove 11 is from 3 μm to 5 μm.

Further, as illustrated in FIG. 6, the contact hole 41g for electrically coupling the scan line 3a and the gate electrode 8a of the transistor 30 is provided in the first interlayer insulating film 41, and the contact hole 41g extends through the first interlayer insulating film 41. Thus, a recessed portion 42g is formed in the second interlayer insulating film 42 by the contact hole 41g at a position overlapping in plan view with the scan line 3a. Here, the recessed portion 42g has a depth such that a bottom 42g0 is positioned on the substrate body 19 side of a portion of the gate electrode 8a overlapping with the semiconductor film 31a, and the stacked film 550 including the first capacitance electrode 4a, the dielectric film 40, and the second capacitance electrode 5a is also provided inside the recessed portion 42g. In other words, the bottom 42g0 of the recessed portion 42g is positioned on the substrate body 19 side of an interface between the gate electrode 8a and the second interlayer insulating film 42 at a portion overlapping in plan view with the semiconductor film 31a, and a stacked film 550 is provided along an inner wall of the recessed portion 42g. Accordingly, the capacitance element 55 includes a third element portion 553 provided along the inner wall of the recessed portion 42g, and in the present exemplary embodiment, the third element portion 553 is a part of the first element portion 551.

In FIG. 5 and FIG. 6, the interlayer insulating films 44 and 45 are formed on an upper layer side of the interlayer insulating film 43. The data line 6a and the relay electrodes 6b and 6c are provided in an interlayer between the interlayer insulating film 43 and the interlayer insulating film 44. The data line 6a and the relay electrodes 6b and 6c are each formed of the same conductive film. Any of the data line 6a, the relay electrodes 6b, and 6c includes a light shielding conductive film such as a metal silicide film, a metal film, or a metal compound film. For example, the data line 6a, the relay electrodes 6b, and 6c are each formed by multilayer structure of titanium layer/titanium nitride layer/aluminum layer/titanium nitride layer, or multilayer structure of titanium nitride layer/aluminum layer/titanium nitride layer.

A contact hole 43a is provided in the second interlayer insulating film 42 and the interlayer insulating film 43, and the contact hole 43a extends through the gate insulating film 32, the second interlayer insulating film 42, and the interlayer insulating film 43. The data line 6a is electrically coupled to the first region 31t of the semiconductor film 31a via the contact hole 43a. The contact hole 43a is formed in a portion corresponding to the notch 4a3 of the first capacitance electrode 4a, and the notch 5a3 of the second capacitance electrode 5a described with reference to FIG. 8. Accordingly, the contact hole 43a and the capacitance element 55 can be separated. A contact hole 43b is provided in the interlayer insulating film 43, and the contact hole 43b extends through the interlayer insulating film 43. The relay electrode 6b is electrically coupled to the first capacitance electrode 4a via a contact hole 43b. The contact hole 43b is formed in a portion corresponding to the notch 5a4 of the second capacitance electrode 5a described with reference to FIG. 8. A contact hole 43c is provided in the interlayer insulating film 43, and the relay electrode 6c is electrically coupled to the second capacitance electrode 5a via a contact hole 43c. In the present exemplary embodiment, the relay electrode 6c covers at least from the first low concentration region 31u to the second low concentration region 31f of the semiconductor film 31a from the pixel electrode 9a side.

The capacitance line 7a and the relay electrode 7b are provided in an interlayer between the interlayer insulating film 44 and the interlayer insulating film 45. The capacitance line 7a and the relay electrode 7b are each formed of the same conductive film. Any of the capacitance line 7a, and the relay electrode 7b includes a light shielding conductive film such as a metal silicide film, a metal film, or a metal compound film. For example, the capacitance line 7a, and the relay electrode 7b are each formed by multilayer structure of titanium layer/titanium nitride layer/aluminum layer/ titanium nitride layer, or multilayer structure of titanium nitride layer/aluminum layer/titanium nitride layer.

A contact hole 44c is provided in the interlayer insulating film 44, and the capacitance line 7a is electrically coupled to the relay electrode 6c via the contact hole 44c. Therefore, the capacitance line 7a is electrically coupled to the second capacitance electrode 5a via the relay electrode 6c, and constant potential is applied to the second capacitance electrode 5a from the capacitance line 7a. A contact hole 44b is provided in the interlayer insulating film 44, and the relay electrode 7b is electrically coupled to the relay electrode 6b via the contact hole 44b.

A contact hole 45a is formed in the interlayer insulating film 45, and the pixel electrode 9a is electrically coupled to the relay electrode 7b via the contact hole 45a. Thus, the pixel electrode 9a is electrically coupled to the first capacitance electrode 4a via the relay electrodes 7b and 6b. Here, since the first capacitance electrode 4a is electrically coupled to the second region 31e of the semiconductor film 31a via the contact hole 42a, the pixel electrode 9a is electrically coupled to the second region 31e of the semiconductor film 31a via the first capacitance electrode 4a.

4. Configuration Around Contact Hole 41g

Figure 10:
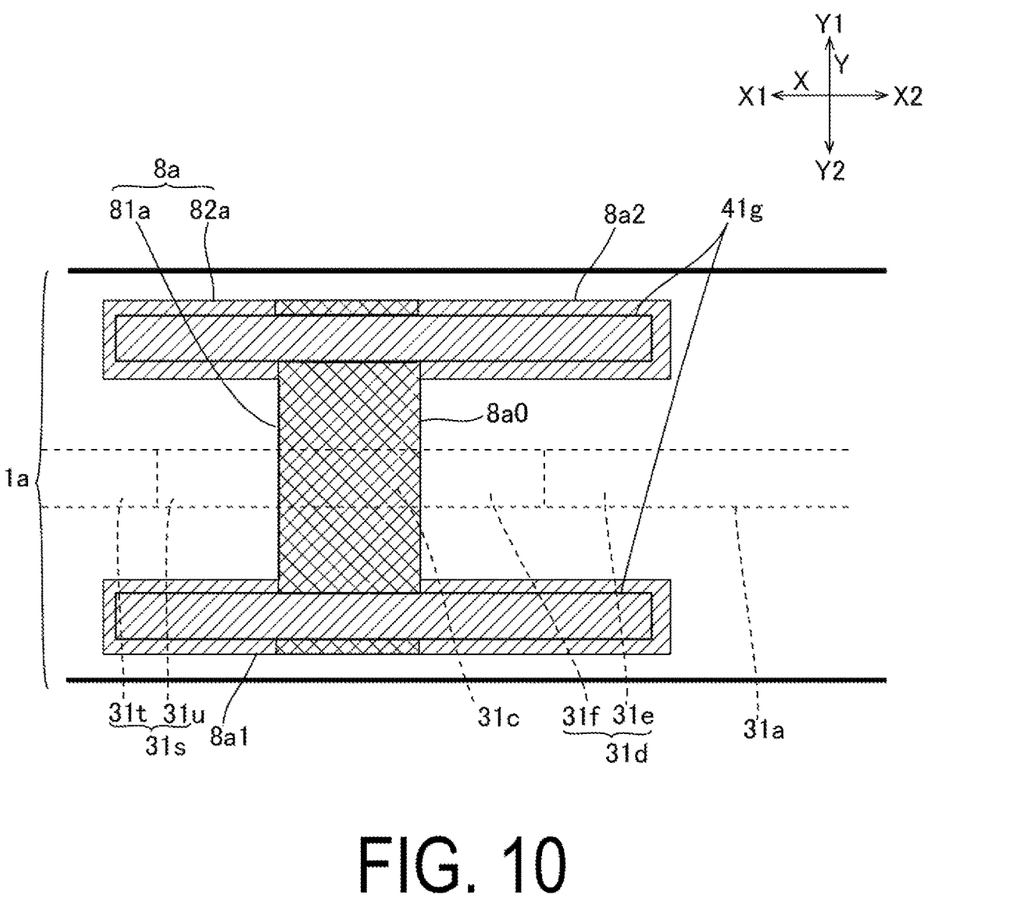
FIG. 10 is an enlarged plan view illustrating a periphery of a contact hole illustrated in FIG. 7.

FIG. 10 is an enlarged plan view illustrating a periphery of the contact hole 41g illustrated in FIG. 7. The gate electrode 8a is formed by stacking a polysilicon layer 81a and a light shielding layer 82a. In FIG. 10, the polysilicon layer 81a is hatched with oblique lines lowering to the right, and the light shielding layer 82a is hatched with oblique lines rising to the right. Therefore, a region hatched with oblique lines lowering to the right and oblique lines rising to the right indicates that the polysilicon layer 81a and the light shielding layer 82a are stacked.

As illustrated in FIG. 10, the contact hole 41g extends along the first direction X on both sides of a side of the semiconductor film 31a, and overlaps with both the gate electrode 8a and the scan line 3a in plan view. Accordingly, the gate electrode 8a is electrically coupled to the scan line 3a via the contact hole 41g, and thus a scanning signal is applied from the scan line 3a.

Here, the contact hole 41g is provided at least along the second low concentration region 31f. In the present exemplary embodiment, the contact hole 41g extends at least from both sides of a side of the first low concentration region 31u, through both sides of a side of the channel region 31c, to both sides of a side of the second low concentration region 31f.

In the present exemplary embodiment, the gate electrode 8a is configured by stacking the conductive polysilicon layer 81a extending in the second direction Y so as to intersect the semiconductor film 31a, and the light shielding layer 82a covering the polysilicon layer 81a. The light shielding layer 82a is formed from a material having a higher light shielding property than that of the polysilicon layer 81a. For example, the light shielding layer 82a is formed from a light shielding film such as tungsten silicide.

The light shielding layer 82a is formed over a wider area than the polysilicon layer 81a, and covers the entire polysilicon layer 81a. Therefore, in a region in the gate electrode 8a where the polysilicon layer 81a is formed, the polysilicon layer 81a and the light shielding layer 82a are formed in two-layer structure, and in a region in the gate electrode 8a where the polysilicon layer 81a is not formed, the light shielding layer 82a is formed in single layer structure. For example, in the gate electrode 8a, the polysilicon layer 81a is not formed inside the contact hole 41g, and the light shielding layer 82a is formed in single layer structure. Accordingly, the light shielding layer 82a is provided along an entire side surface of the contact hole 41g. In contrast, of the first electrode portion 8a0 extending in the second direction Y in the gate electrode 8a, in a portion outside the contact hole 41g, the polysilicon layer 81a and the light shielding layer 82a is formed in two-layer structure.

Such a configuration is achieved by the following processes. First, the scan line 3a, the first interlayer insulating film 41, the semiconductor film 31a, and the gate insulating film 32 are formed. Next, after a conductive polysilicon film is formed, the polysilicon film is patterned to form the polysilicon layer 81a extending in the second direction Y intersecting the semiconductor film 31a.

Next, with an etching mask formed, the polysilicon layer 81a and the first interlayer insulating film 41 are etched to form the contact hole 41g. Therefore, the polysilicon layer 81a is not present inside the contact hole 41g. Next, after a light shielding-film is formed, the light shielding film is patterned to form the light shielding layer 82a, as illustrated in FIG. 10.

6. Main Effects of the Present Exemplary Embodiment

As described above, in the electro-optical device 100 of the present exemplary embodiment, the groove 11 that extends through the first interlayer insulating film 41 and the second interlayer insulating film 42 and reaches the substrate body 19 is provided at a position overlapping in plan view with the data line 6a, and the capacitance element 55 includes the first element portion 551 provided between the second interlayer insulating film 42 and the pixel electrode 9a, and the second element portion 552 provided along the inner wall of the groove 11. Accordingly, capacitance of the capacitance element 55 is a sum of capacitance of the first element portion 551 and capacitance of the second element portion 552. Furthermore, the groove 11 extends through a thick insulating film including the first interlayer insulating film 41 and the second interlayer insulating film 42 and reaches the substrate body 19. In particular, in the present exemplary embodiment, the groove 11 reaches the intermediate position in the thickness direction of the substrate body 19. Therefore, because the groove 11 is deep, the capacitance of the second element portion 552 is large. Therefore, even when a pixel pitch is narrowed, the capacitance element 55 having large capacitance can be constituted while ensuring a high pixel opening ratio.

Additionally, the capacitance element 55 includes the third element portion 553 provided along the inner wall of the recessed portion 42g provided in the second interlayer insulating film 42, so the capacitance is large.

Further, the capacitance element 55 includes the first portion 55a extending in the first direction X so as to overlap with the semiconductor film 31a, and the second portion 55b extending in the second direction Y so as to overlap with the data line 6a, so the capacitance of the capacitance element 55 is large.

Furthermore, light incident from the second substrate 20 side is shielded by the data line 6a, the relay electrode 6c, the capacitance line 7a, and the like provided on the second substrate 20 side with respect to the semiconductor film 31a, so incidence on the semiconductor film 31a is suppressed. Further, even when light emitted from the first 10 side is incident again from the first 10 side, the light is shielded by the scan line 3a provided on the substrate body 19 side with respect to the semiconductor film 31a, and thus incidence on the semiconductor film 31a is suppressed. In addition, light traveling in the second direction Y intersecting the semiconductor film 31a is shielded by the gate electrode 8a inside the contact hole 41g that electrically couples the gate electrode 8a and the scan line 3a, so incidence on the semiconductor film 31a is suppressed.

In particular, in the present exemplary embodiment, by providing the second low concentration region 31f between the channel region 31c and the second region 31e, an off leakage current of the transistor 30 is reduced, and the contact hole 41g is provided along at least the second low concentration region 31f. Thus, light traveling in the second direction Y intersecting the semiconductor film 31a toward the second low concentration region 31f can be shielded by the gate electrode 8a inside the contact hole 41g. Therefore, incidence of light on the second low concentration region 31f is efficiently suppressed. Thus, the transistor 30 can sufficiently exhibit characteristics due to LDD structure.

Further, the gate electrode 8a includes the conductive polysilicon layer 81a and the light shielding layer 82a, and the light shielding layer 82a is provided along the side surface of the contact hole 41g. Therefore, the gate electrode 8a has a high light shielding property.

Exemplary Embodiment 2

Figure 11:
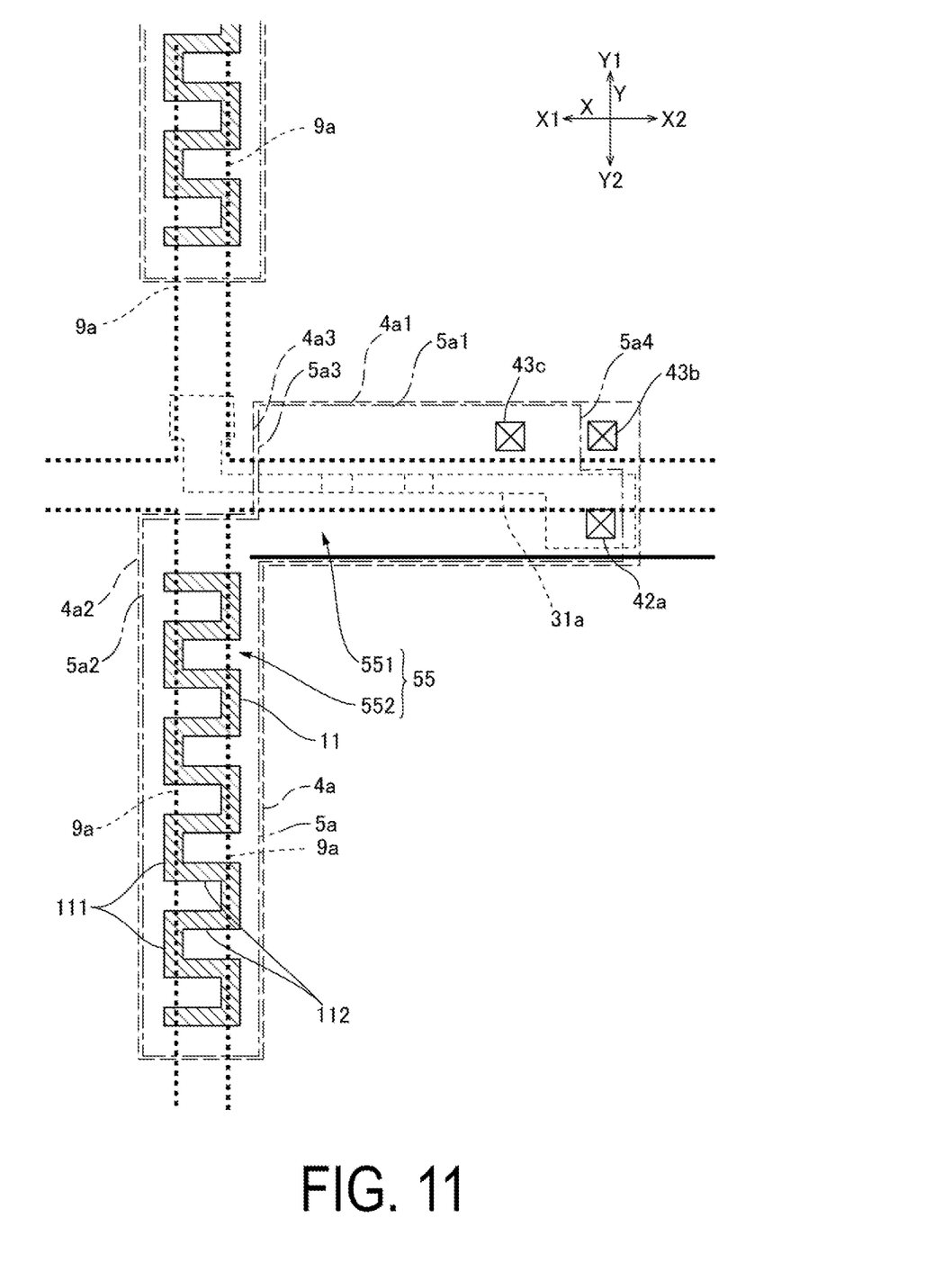
FIG. 11 is an explanatory diagram of an electro-optical device according to Exemplary Embodiment 2 of the present disclosure.

FIG. 11 is an explanatory diagram of the electro-optical device 100 according to Exemplary Embodiment 2 of the present disclosure. FIG. 11 illustrates a plan view of the groove 11, the first capacitance electrode 4a, the second capacitance electrode 5a, and the like. In Exemplary Embodiment 1, the groove 11 extends linearly in the second direction Y in a region overlapping in plan view with the data line 6a. In contrast, in the present exemplary embodiment, as illustrated in FIG. 11, the groove 11 has a planar shape in which a first groove portion 111 extending in a direction along the data line 6a and a second groove portion 112 linked with the first groove portion 111 and extending in a direction intersecting the first groove portion 111 are repeated in a direction along the data line 6a. As a result, an area of the inner wall of the groove 11 is large, so the capacitance of the second element portion 552 is large. Thus, the capacitance element 55 having large capacitance can be constituted.

Other Exemplary Embodiments

In the exemplary embodiments described above, the semiconductor film 31a extends along the scan line 3a, but an aspect may be adopted in which the semiconductor film 31a extends along the data line 6a.

In the exemplary embodiments described above, the data line 6a, the relay electrode 6c, and the capacitance line 7a constitute a light shielding member overlapping in plan view with the semiconductor film 31a from the pixel electrode 9a side, but at least one of the first capacitance electrode 4a and the second capacitance electrode 5a may be a light shielding electrode, and a light shielding member overlapping in plan view with the semiconductor film 31a from the pixel electrode 9a side may be constituted. In the exemplary embodiments described above, the groove 11 reaches the intermediate position in the thickness direction of the substrate body 19, however, as far as the groove 11 reaches the substrate body 19, for example, an aspect may be adopted in which the substrate body 19 is positioned at a bottom of the groove 11.

In the above-described exemplary embodiments, the electro-optical device 100 has been described as an example in which light source light is incident from the second substrate 20 side, but the present disclosure may also be applied to the electro-optical device 100 in which light source light is incident from the first substrate 10 side. Further, in the above-described exemplary embodiments, the case has been illustrated in which the electro-optical device 100 is the transmissive liquid crystal device, however, the present disclosure may be applied to a case in which the electro-optical device 100 is a reflection-type liquid crystal device. Further, the present disclosure may be applied to a case in which the electro-optical device 100 is an organic electroluminescence display device.

Installation Example to Electronic Apparatus

Figure 12:
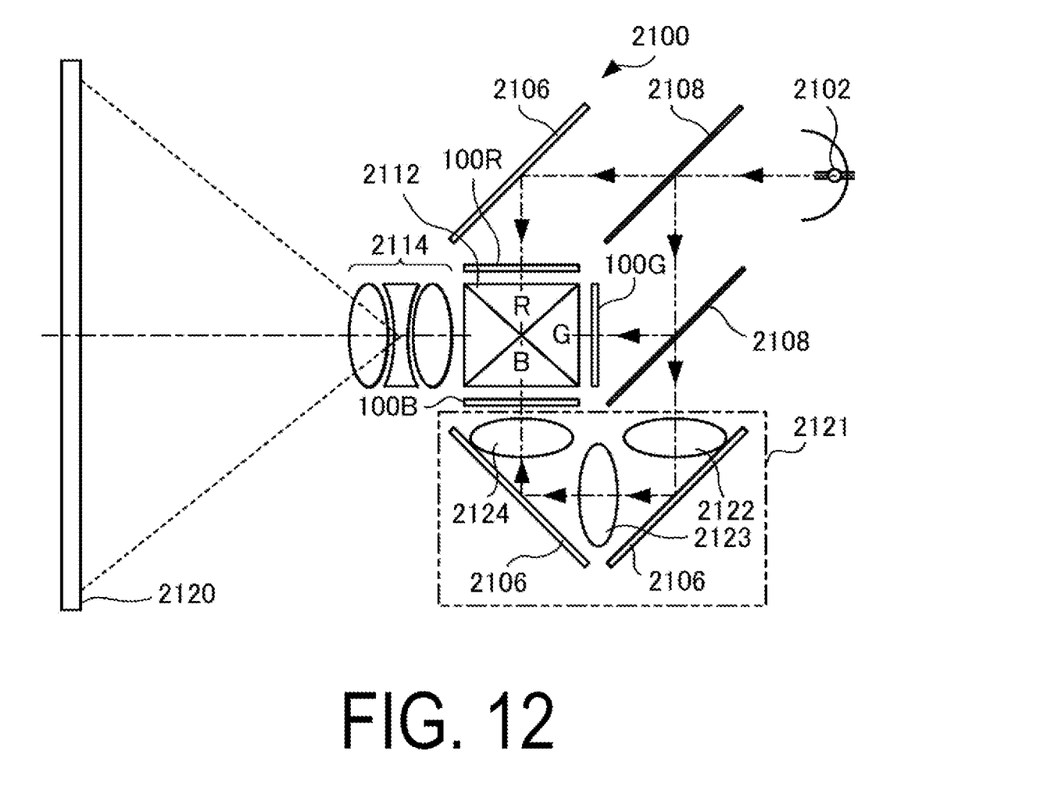
FIG. 12 is a schematic configuration view of a projection-type display device using an electro-optical device to which the present disclosure is applied.

An electronic apparatus using the electro-optical device 100 according to the above-described exemplary embodiments will be described below. FIG. 12 is a schematic configuration view of a projection-type display device using the electro-optical device 100 to which the present disclosure is applied. Illustration of an optical element such as a polarizing plate is omitted in FIG. 12. A projection-type display device 2100 illustrated in FIG. 12 is an example of an electronic apparatus using the electro-optical device 100. The projection-type display device 2100, in which the electro-optical device 100 is used as a light valve, can conduct high-definition and bright display without making the apparatus large. As illustrated in this figure, a light source unit 2102 including a lamp unit and the like including a white light source such as a halogen lamp is provided inside the projection-type display device 2100. Projection light emitted from the light source unit 2102 is split into three primary colors of R (red), G (green), and B (blue) by three mirrors 2106 and two dichroic mirrors 2108 installed inside. The split incident light is guided to light valves 100R, 100G, and 100B corresponding to each of the primary colors, and then modulated. Note that since the light of the B color has a long optical path as compared to the other light of the R color and the G color, the light of the B color is guided via a relay lens system 2121 including an incidence lens 2122, a relay lens 2123, and an emission lens 2124 to prevent a loss due to the long optical path of the light of the B color.

The light modulated by each of the light valves 100R, 100G, and 100B is incident on a dichroic prism 2112 from three directions. Then, at the dichroic prism 2112, the light of the R color and the light of the B color are reflected at 90 degrees, and the light of the G color is transmitted. Accordingly, respective images of the primary colors are synthesized, and subsequently a color image is projected on a screen 2120 by a projection optical system 2114.

Other Projection-Type Display Devices

Note that the projection-type display device may include a configuration in which an LED light source or the like configured to emit light of each color is used as a light source unit and the light of each color emitted from the LED light source is supplied to another liquid-crystal device.

Other Electronic Apparatuses

The electronic apparatus including the electro-optical device 100 to which the present disclosure is applied is not limited to the projection-type display device 2100 of the above-described exemplary embodiment. Examples of the electronic apparatus may include a projection-type head up display, a direct-view-type head mounted display, a personal computer, a digital still camera, and a liquid crystal television.

What is claimed is:

1. An electro-optical device, comprising:
    a substrate body;
    a pixel electrode;
    a light shielding scan line extending in a first direction in a layer between the substrate body and the pixel electrode;
    a first interlayer insulating film provided in a layer between the light shielding scan line and the pixel electrode;
    a light shielding data line extending in a second direction intersecting the first direction in a layer between the first interlayer insulating film and the pixel electrode;
    a transistor including a semiconductor film extending between the first interlayer insulating film and the light shielding data line so as to overlap with the light shielding scan line and the light shielding data line;
    a second interlayer insulating film provided in a layer between the transistor and the pixel electrode; and
    a capacitance element electrically coupled to the pixel electrode, wherein
    a groove is provided that extends through the first interlayer insulating film and the second interlayer insulating film at a position overlapping in plan view with the light shielding data line and reaches the substrate body, and
    the capacitance element includes a first element portion provided between the second interlayer insulating film and the pixel electrode, and a second element portion provided along an inner wall of the groove.

2. The electro-optical device according to claim 1, wherein
    in the capacitance element, a stacked film including a first capacitance electrode, a dielectric film, and a second capacitance electrode extends from an inside of the groove to between the second interlayer insulating film and the pixel electrode, and
    the first element portion is constituted by a portion of the stacked film provided between the second interlayer insulating film and the pixel electrode, and the second element portion is constituted by a portion of the stacked film provided inside the groove.

3. The electro-optical device according to claim 1, wherein
    the groove has a planar shape in which a first groove portion extending in a direction along the light shielding data line, and a second groove portion linked with the first groove portion and extending in a direction intersecting the first groove portion, are repeated in a direction along the light shielding data line.

4. The electro-optical device according to claim 1, wherein
    the second interlayer insulating film is provided with a recessed portion having a depth such that a bottom of the recessed portion is positioned on the substrate body side of a portion of a gate electrode of the transistor overlapping with the semiconductor film at a position overlapping in plan view with the light shielding scan line, and
    the capacitance element includes a third element portion provided along an inner wall of the recessed portion.

5. The electro-optical device according to claim 4, wherein
    the semiconductor film includes a channel region, a first region to which the light shielding data line is electrically coupled at a position spaced apart from the channel region, a first low concentration region provided between the channel region and the first region, and having a lower impurity concentration than that of the first region, a second region that is spaced apart from the channel region to a side opposite the first direction, and to which the pixel electrode is electrically coupled, and a second low concentration region provided between the channel region and the second region, and having a lower impurity concentration than that of the second region, and
    on at least one side in a width direction of the second low concentration region, a contact hole electrically coupling a gate electrode of the transistor and the light shielding scan line is provided.

6. The electro-optical device according to claim 1, wherein
    the groove reaches an intermediate position in a thickness direction of the substrate body.

7. The electro-optical device according to claim 6, wherein
    a depth of the groove is 3 µm or greater.

8. An electronic apparatus, comprising:
    the electro-optical device according to claim 1.

* * * * *